Jan. 11, 1938.  P. H. WILSON ET AL  2,105,022
PIPE JOINT
Filed Jan. 30, 1935   2 Sheets-Sheet 1

P. H. Wilson
W. Ridley
INVENTORS

By: Glascock Downing Seebold
Attys.

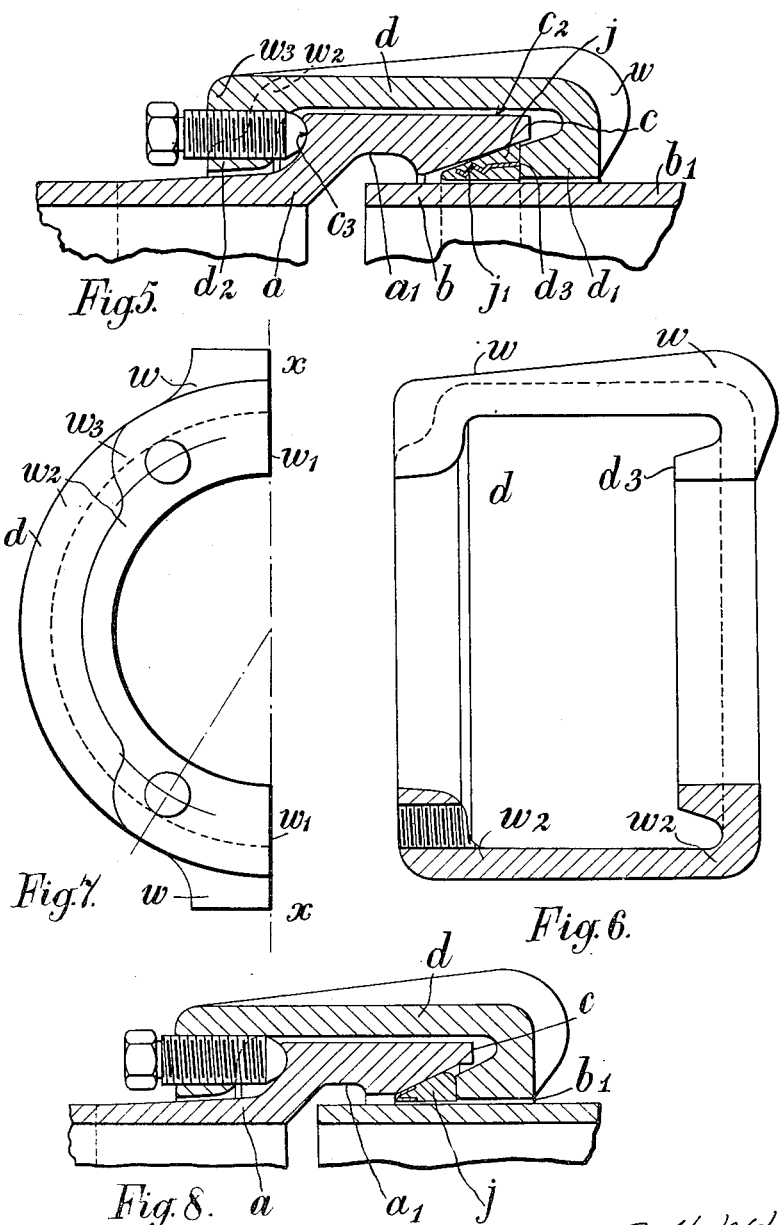

Patented Jan. 11, 1938

2,105,022

UNITED STATES PATENT OFFICE 2,105,022

PIPE JOINT

Percy Hutchinson Wilson, Sherwood, Nottingham, and William Ridley, Beeston, England, assignors of one-third to The Stanton Ironworks Company Limited, Stanton-by-Dale, near Nottingham, England Application January 30, 1935, Serial No. 4,182
In Great Britain February 9, 1934

7 Claims. (Cl. 285—135)

This invention relates to and has for its general object improved joints for pipes and like hollow bodies and of the kind wherein jointing material in the form of a ring is accommodated between overlapping male and female sections and has pressure applied to it more usually axially by means movable over or in relation to such sections. It aims also at furnishing a means of jointing which simplifies both the actual making of the joint between pipe sections and the like and the moulding and general manufacture, more especially of socket or female elements.

The invention consists in a pipe joint or the like of the kind indicated comprising a pressure-applying device applicable in portions to embrace the pipe periphery at the joint region.

The invention also consists in a pipe joint or the like as indicated wherein the portions of said device are retained in correct position mutually and in relation to the pipe by reaction of the pressure applied through them to the jointing material.

The invention further consists in a pipe joint or the like as indicated wherein means carried by and axially movable in relation to said pressure-applying device is engageable with the pipe directly or with a gland ring or the like operative upon the jointing material.

The invention further consists in a pipe joint as indicated wherein said pressure-applying device embraces the outside of the female section and is provided with an inwardly directed end region enterable into a jointing space to engage a joint ring therein while the other end is furnished with tensioning means reacting directly or indirectly upon the pipe.

The invention further consists in a pipe or like joint having a pressure-applying ring or collar for acting on a joint ring and divided into arcuate portions separately applicable to the pipes or the like and means serving the double purpose of connecting said portions circumferentially and of axially displacing the ring or collar or similarly acting for producing the required sealing pressure.

The invention also consists in the improved pipe joints for spigot and socket or double spigot pipe sections, substantially as hereinafter set forth.

Referring to the accompanying drawings:—

Figure 5 is a sectional view of a modified construction of pipe joint.

Figures 6 and 7 are, respectively, a plan (partly in section) and end view of a form of half collar.

Figure 8 is a sectional view of a construction with a modified socket interior.

Figures 1, 2:
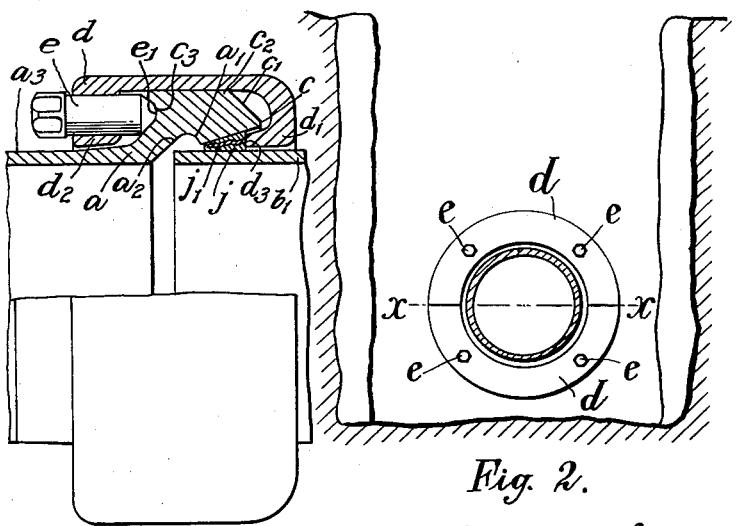
Figure 1 is an axial section of a spigot and socket construction of joint in accordance with the present invention.
Figure 2 is a cross sectional view of a joint of the kind shown in Figure 1, the section being also taken through a trench to show the pipe in a common position of usage ordinarily awkward for making joints.

In carrying the invention into effect in the convenient form shown in Figure 1, as applied to a spigot and socket joint, the socket comprises a convergent mouth portion determining with the exterior $b_1$ of the spigot $b$ (entering with considerable clearance) a wedge-section space in which the joint ring $j$ is received in a generally known way. Joining said portion to the bore of the socket section is a portion $a_1$ of somewhat enlarged radius leading to a second convergent portion $a_2$, thus forming an annular chamber for accommodating a considerable amount of misalignment of the end of the spigot inside the socket, the joint being intended to be flexible and to accommodate expansion and contraction. The end of the socket comprises a narrow flat annular surface $c$ from which the exterior surface is coned back at $c_1$ to meet a cylindrical surface $c_2$ continuing axially over the chamber in the socket interior. At this point the exterior of the socket is stepped down and defined by an annular concave or semi-circular surface or shoulder $c_3$ curved into the external surface $a_3$ of the pipe.

The device for applying pressure to the joint ring comprises a collar $d$ aproximately of elongated C-section adapted to embrace the socket, one end being in section hooked inwardly and slightly tapered as at $d_1$ so as to be enterable into the jointing space above referred to; and the other end $d_2$ being of thicker section turned or flanged in on the opposite side or back of the socket enlargement. The middle portion is of cylindrical form adapted to fit slidably over the cylindrical exterior $c_2$ of the socket so that the collar can be moved axially over the pipe to engage the jointing ring and apply pressure thereto. This operation is effected by a number of screws $e$ distributed suitably, as hereinafter explained, and passing axially through tapped holes in the flanged end $d_2$ of the device to bear with nosed ends or points $e_1$ preferably complementarily in the annular concave surface $c_3$ at the back of the socket exterior. With the hooked end $d_1$ of the collar engaging the joint ring $j$, the action of screwing in the screws $e$ draws the collar axially over the socket and forces the joint ring into the latter with the requisite pressure to obtain a good seal.

The pressure-applying collar is formed in two halves, see Figure 2, divided on a diametral plane $x$—$x$, which halves are not directly connected to one another but on the other hand are, when assembled over the pipe socket, retained together in correct relative position, and any tendency for them to separate obviated, by the action of the pressure-applying screws referred to. It is important for obtaining this effect that the screws $e$ be correctly located for proper co-operation with the groove $c_3$ behind the socket, and the registering of the thrust face $d_3$ of the collar inside the socket when engaging the joint ring is also important as will now be explained.

Referring to Figure 2, the location of the screws (which may be two or more for each half collar, e. g. according to the diameter of the pipe and the pressure to be applied) is such as to produce an equal pressure moment on either side of a line passing through the centres of the screws and parallel to the diametral plane of division. In other words, if a half circle of cardboard of an inside diameter equal to the inside diameter of the collar $d$ adjacent to the spigot $b_1$ of the pipe, and of an outside diameter equal to that of the collar at $d_1$ where same enters and registers inside the socket of the pipe, were balanced on a knife edge placed parallel to the diametral border, a suitable location for the screws if two are used as shown would be in any convenient position along this line. This feature of equal pressure moment together with the registering of the nose of the collar, and also the semi-circular groove at the back of the socket, obviates any tendency for the two halves of the collar to separate when the joint is being made.

In assembling the joint with the spigot entered into the socket and the joint ring pushed into its space, one half collar is conveniently laid over the top of the socket, the screws tightened up by hand, and the half-collar allowed to slide round on to the underside of the pipe; after which the second half of the collar is placed in position on top of the first and all four screws are then tightened up uniformly until the joint is made. Finally the end faces of the half-collars should coincide.

The joint ring may be of any kind suitable also for use in conjunction with any types of gland-pattern joints and the like. It may thus be of lead with a harder metal reinforcement such as that indicated by $j_1$, or with an incompressible filling or of any other suitable type.

Joints as above may be used on cast iron pipes with a cast iron collar and cast iron or malleable iron screws, and also with the whole arrangement, i. e. pipes, collars and screws, in steel, or any other suitable materials or combinations of such.

The screws may be either gas thread or standard Whitworth thread, and may be provided with a square or hexagon head (as shown) or with a sunk square or hexagon recess, for use with any simple type of ratchet or other spanner.

Figure 3:
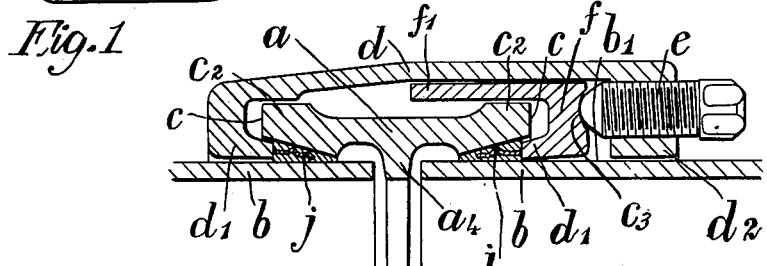
Figure 3 is a view on the same lines as Figure 1 showing, however, a modified construction for jointing two spigot pipes by means of an intermediate female element.

In the modified construction shown in Figure 3, (in which parts corresponding in their functions with parts of the above described construction are given the same reference numerals as far as practicable) suitable for jointing two spigot pipe sections $b$ with a double-ended female or socket section $a$, the latter may be symmetrical about a central plane of rotation, each half conforming more or less in internal and external outline with the socket end described above. The end faces $c$, $c$ may however be wholly radial and directly meet somewhat shortened cylindrical peripheral surfaces $c_2$, joined by a reduced diameter portion. Internally a central annular rib $a_4$ defines on either side a chamber for receiving a spigot extremity within the adjacent jointing space.

In this case a collar $d$ of axially elongated form is employed such as to engage at one end $d_1$ with one $j$ of the joint rings as already explained, to embrace the whole length of the female section $a$ and extend some considerable distance beyond the other end of the latter before being flanged in at $d_2$ and provided with screws $e$. These latter bear at their ends or points in a concave annular groove $c_3$ formed in this instance in a lateral face of a second or gland ring $f$ which is of U- or L-section and is contained between the collar $d$, the flange $d_2$ thereof and the adjacent spigot exterior $b_1$. Preferably the second ring $f$, one annular portion $d_1$ of which is shaped to act upon the joint ring $j_2$ in the same way as the hooked end $d_1$ of the collar does upon the joint ring $j$, has an outer wall $f_1$ of cylindrical shape freely slidable between the adjoining end $c_2$ of the female section $a$ and the interior of the intermediate portion of the collar $d$. The collar is divided, for instance, into halves, as in the other form of the invention, and the second ring $f$ may also be divided into a number of sections or in one piece as may be most suitable. The number and distribution of the screws and method of assembling the parts are preferably also as hereinbefore described.

Figure 4:
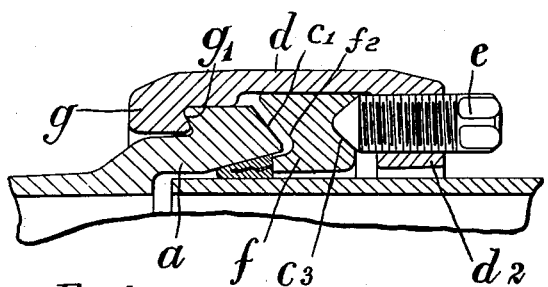
Figure 4 is a section of a further modification of spigot and socket joint.

In a further modified construction shown in Figure 4, one end $g$ of the collar $d$ (formed in sections as before) may be shaped to overlap the socket and engage peripherally therewith in undercut frusto-conical annular shoulder surfaces at $g_1$; while screws $e$ passing through an inturned flange $d_2$ at the other end of the collar are arranged to act upon a second or gland ring $f$ (preferably in one piece) accommodated within the collar and axially displaceable by said screws to force home the joint ring. The end face $c_1$ of the socket $a$ may be coned back or nosed, the gland ring being of such a section as to be at one side $f_2$ more or less complementary with the socket in the region of said end face $c_1$, and at the other side provided with an annular recess $c_3$ to receive the preferably complementary points of the screws $e$. It will be noted that conical points are used with a triangular section recess.

An important advantage accruing from the arrangements shown is the simplified mould required to form the type of socket or female sections in spinning or centrifugal casting machines; resulting in more uniform cooling of the mould and a cheapening in the cost of boring same.

It will be noted also that the screws themselves are in compression when making the joint; while the only tension element used is the collar which, due to its being necessarily of the maximum overall dimensions, is of ample strength for this duty even if mainly of a light cross section between its ends.

The modifications illustrated in Figures 5, 6 and 7, reference letters of which correspond to those used on the previous figures, differ principally in the use of a relatively longer socket and correspondingly lengthened collar which latter also is thickened up at $w$ to provide widened contact faces $w_1$ for engagement of the halves or sections constituting the collar; the wall of the collar is, on the other hand, kept as far as possible of constant and minimum thickness at regions such as $w_2$ and thickened up only locally at $w_3$ for accommodation of the set screws.

The intermediate portion of the collar is of a bore somewhat greater than the outside diameter of the socket at $c_2$ and there is no co-operation of these parts.

In the above described construction machining is obviated in the region of the socket, the type of joint ring shown comprising a solid lead body with a harder metal reinforcement which functions well against surfaces in the condition left from centrifugal casting; whereas in the construction shown in Figure 8 the socket is machined internally to accommodate the form of joint ring, for example, solid rubber tipped with lead, which has been found to function most satisfactorily against a prepared socket surface.

Modifications and additions may be introduced within the scope of the foregoing statements of invention, the specific description being by way of example only.

We claim:

1. In a joint for pipes and like hollow bodies having overlapping male and female sections and a segmental collar located around the junction of said sections for compressing jointing material to form a seal between said sections, an undivided ring element embracing and axially movable over the male section and presenting laterally an annular groove, force-generating means carried by said collar and operative upon said ring element by engagement with said annular groove, and means for axially anchoring said collar to the female section.

2. In a joint for pipes and like hollow bodies having overlapping male and female sections and a segmental collar located around the junction of said sections for compressing jointing material to form a seal between said sections, an annular groove formed laterally in and around said female section, force-generating means carried on said collar adjacent one end thereof and operative upon said section by engagement with said groove to displace the collar in relation to said section, and an inwardly directed portion of said collar operatively engageable with said jointing material, said groove and said force-generating means co-operating to form a connection between the collar segments.

3. In a joint for pipes and like hollow bodies having overlapping male and female sections and a segmental collar located around the junction of said sections for compressing jointing material to form a seal between said sections, an annular groove formed laterally in and around said female section, a radially inturned end portion of said collar interlocking complementarily with said groove, a peripherally continuous ring element movable over the male section to engage at one side said jointing material and presenting to its other side an annular groove, force-generating means carried in an inturned portion at the opposite end of the collar and operative upon said ring element by engagement with said groove thereof to displace the same in relation to said collar.

4. In a spigot and socket pipe joint, a socket having an enlargement formed externally with an annular groove affording a shoulder, and a device for pressing home a jointing ring for sealing the pipe sections, said device comprising a segmental collar having at one end an inturned shoulder complementarily engageable with the socket shoulder, and at its opposite end an inturned portion carrying axially directed screws, and a solid gland ring positioned between said inturned portion and the socket end, said gland ring having an annular groove for reception of the ends of said screws.

5. In a spigot and socket pipe joint, a socket having an enlargement formed externally with an annular groove affording a shoulder, and a device for pressing home a jointing ring for sealing the pipe sections, said device comprising a segmental collar axially movable over said enlargement and having inturned end portions respectively engageable with the jointing ring, and carrying axially directed screws, enterable into said groove on the socket.

6. In a joint for pipes and like hollow bodies sealing with opposite ends of a female connection section by inwardly pressed rings of jointing material, a solid gland ring engageable with one of said rings and having an annular groove to its outer side, a segmental collar axially movable over said female section and said gland ring, said collar having inturned ends one of which is provided with axially directed screws engageable with said gland ring groove, and the other of which ends is engageable with the opposite jointing ring.

7. In combination, a male pipe section, a sealing ring surrounding said section, a collar composed of segment portions arranged partially about said male section and having an inturned flange engaging said ring, pressure generating elements disposed parallel to the axis of and distributed around one end of said collar, a tubular element having a wedge surface sleeved over said male section to provide a seat for said sealing ring and having a lateral groove extending circumferentially unbroken around said tubular element within and distinct from said collar, said pressure generating elements being axially engaged in said groove to effect relative displacement of said collar axially with respect to said tubular element and cooperating with said flange to restrain said collar segments from radial displacement.

PERCY H. WILSON.
WILLIAM RIDLEY.